(12) United States Patent
Roberts et al.

(10) Patent No.: US 12,744,399 B2
(45) Date of Patent: Sep. 22, 2026

(54) BATTERY CHARGER INCLUDING AN ANTI-THEFT MECHANISM

(71) Applicant: MILWAUKEE ELECTRIC TOOL CORPORATION, Brookfield, WI (US)

(72) Inventors: Alec C. Roberts, Milwaukee, WI (US); Abed Al Fattah I. Shafie, Franklin, WI (US); Shreyas Sridar, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 885 days.

(21) Appl. No.: 18/102,303

(22) Filed: Jan. 27, 2023

(65) Prior Publication Data

US 2023/0246464 A1 Aug. 3, 2023

Related U.S. Application Data

(60) Provisional application No. 63/304,222, filed on Jan. 28, 2022.

(51) Int. Cl.
*H02J 7/70* (2026.01)
*E05B 65/00* (2006.01)
*H01M 10/46* (2006.01)

(52) U.S. Cl.
CPC ............ *H02J 7/751* (2026.01); *E05B 65/006* (2013.01); *H01M 10/46* (2013.01)

(58) Field of Classification Search
CPC ........................................................ H02J 7/70
See application file for complete search history.

(56) References Cited

U.S. PATENT DOCUMENTS 6,057,055 A * 5/2000 Kumagawa ......... H01M 50/204 429/97
6,742,818 B2 * 6/2004 Seki ........................ E05B 83/16 292/216

(Continued)

FOREIGN PATENT DOCUMENTS

| DE | 102004059128 A1 | 7/2005 |
|---|---|---|
| DE | 102017211006 A1 | 1/2019 |

OTHER PUBLICATIONS

U.S. Appl. No. 18/820,454, filed Aug. 30, 2024, by Vashi et al. (Copy not submitted herewith pursuant to the waiver of 37 C.F. R. § 1.98(a)(2)(iii) issued by the Office on Oct. 19, 2004).

*Primary Examiner* — Tynese V McDaniel
(74) *Attorney, Agent, or Firm* — Michael Best & Friedrich LLP

(57) ABSTRACT

A battery charging system includes a housing and an anti-theft mechanism. A battery pack can be coupled to the housing. The battery pack includes release buttons that allow removal of the battery from the housing. An anti-theft mechanism is coupled to the housing. The anti-theft mechanism includes an arm, a cover, and a lock. The arm extends away from the housing and can be engaged by a battery pack. The arm is movable in response to engagement by the battery pack. The cover is movable from a retracted position to a deployed position in response to the battery pack engaging the arm. The cover is configured to cover the release buttons in the deployed position. The lock is coupled to the housing and has a locked mode and an unlocked mode and is configured to maintain the cover in the deployed position when in the locked mode.

20 Claims, 13 Drawing Sheets

(56) References Cited

U.S. PATENT DOCUMENTS 7,759,899 B2 7/2010 Hanawa et al.
7,838,142 B2 11/2010 Scheucher
7,946,080 B2 * 5/2011 Ellerton .................... E05C 7/04 292/42
7,948,207 B2 5/2011 Scheucher
7,990,102 B2 8/2011 Scheucher
8,025,118 B2 9/2011 Scheucher
8,026,698 B2 9/2011 Scheucher
8,084,154 B2 12/2011 Scheucher
8,131,145 B2 3/2012 Scheucher
8,415,924 B2 4/2013 Matthias et al.
8,698,452 B2 4/2014 Scheucher
8,710,795 B2 4/2014 Scheucher
8,729,865 B2 5/2014 Scheucher
8,796,987 B2 8/2014 Scheucher
8,815,424 B2 8/2014 Scheucher
8,860,377 B2 10/2014 Scheucher
8,872,474 B2 10/2014 Scheucher
8,890,478 B2 11/2014 Matthias et al.
8,970,164 B2 3/2015 Scheucher
9,059,447 B2 6/2015 Scheucher
9,273,857 B2 * 3/2016 Rosenbecker ........ F21V 21/406
9,381,822 B2 7/2016 Scheucher
9,906,055 B2 2/2018 Taga et al.
10,109,888 B2 10/2018 Scheucher
10,389,139 B2 8/2019 Velderman et al.
10,618,692 B2 4/2020 Hori et al.
10,666,064 B2 5/2020 Hennesy
10,840,717 B2 11/2020 Taga et al.
11,011,919 B2 5/2021 Velderman et al.
11,031,795 B2 6/2021 Velderman et al.
11,251,623 B2 2/2022 Kohler et al.
11,374,413 B2 6/2022 Hennesy et al.
12,612,916 B2 * 4/2026 Avila .................... F04D 13/068
2004/0224221 A1 * 11/2004 Chen ................... H04M 1/0262 429/96
2006/0211297 A1 * 9/2006 Mizuguchi .......... H01M 50/213 439/500
2009/0280699 A1 * 11/2009 Vejux ................... H01R 13/641 439/772
2013/0161107 A1 * 6/2013 Tsukamoto .............. B62M 7/12 180/220
2015/0114051 A1 * 4/2015 Mao ..................... H05K 5/0221 70/57
2016/0099590 A1 4/2016 Velderman et al.
2019/0051947 A1 2/2019 Scheucher
2020/0039607 A1 * 2/2020 Heinemann .............. B62J 99/00
2020/0287397 A1 * 9/2020 Jiao ......................... H02J 7/751
2021/0028634 A1 1/2021 Taga et al.
2021/0057694 A1 * 2/2021 Zeiler ................. H01M 10/655
2022/0200298 A1 * 6/2022 Brier .................. G08B 13/1436
2022/0352734 A1 * 11/2022 Lloyd ..................... F21V 33/00
2023/0074283 A1 * 3/2023 Malcolm ............ G06Q 10/0836
2023/0383573 A1 * 11/2023 Xiao ................... E05B 47/0001
2025/0079859 A1 * 3/2025 Vashi ........................ H02J 7/70

* cited by examiner

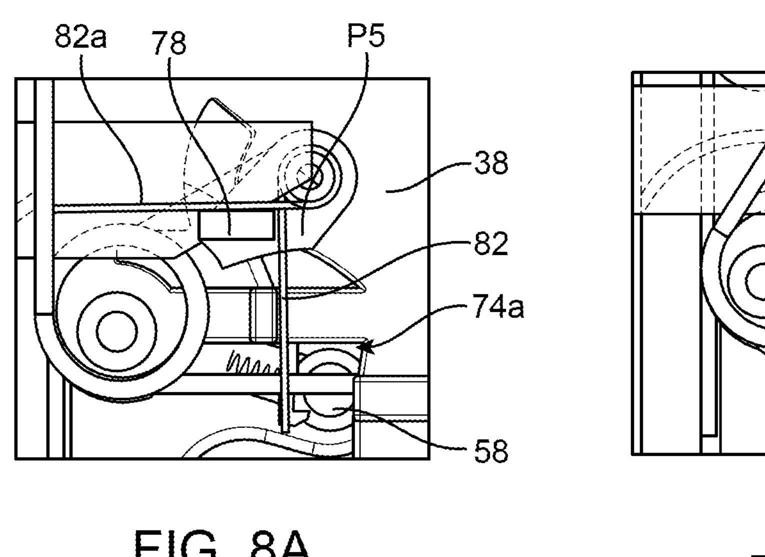
FIG. 8A
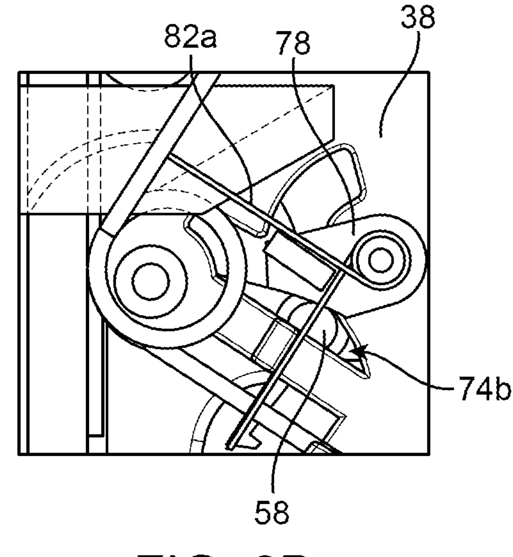
FIG. 8B
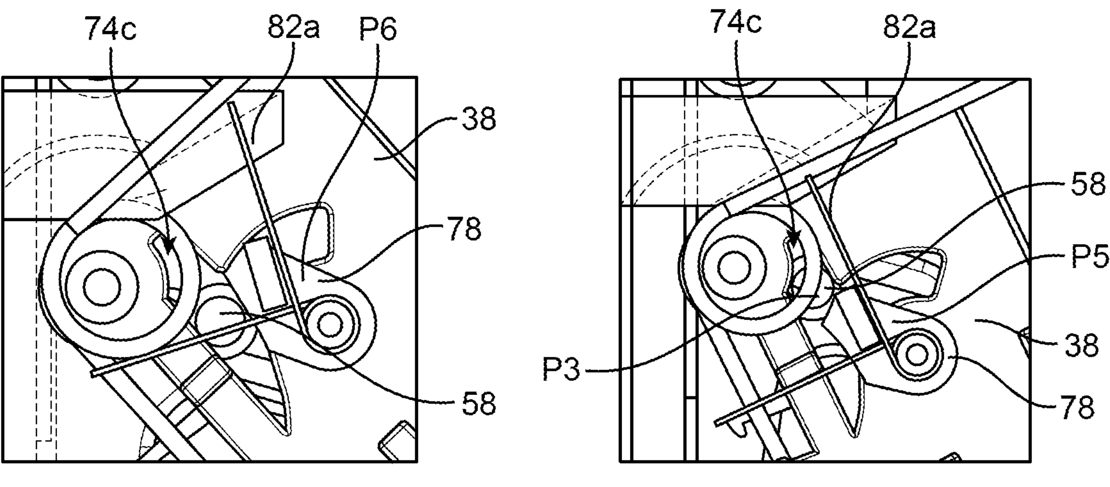
FIG. 8C
FIG. 8D

BATTERY CHARGER INCLUDING AN ANTI-THEFT MECHANISM

CROSS-REFERENCE TO RELATED APPLICATIONS

This application claims priority to U.S. Provisional Patent Application No. 63/304,222, filed on Jan. 28, 2022, the entire content of which is incorporated herein by reference.

FIELD

The present disclosure relates to battery charger, in particular, a battery charging having an anti-theft mechanism.

BACKGROUND

A battery pack coupled to a battery charger may include at least one button for removal from the battery charger. In a work environment accessible by many workers, a battery pack may be easily removed from a charger by someone who is not the owner without the knowledge or consent of the owner. The present disclosure provides a battery charger with an anti-theft mechanism to prevent others from removing a battery pack from a charger without first unlocking the battery.

SUMMARY

In one embodiment, the disclosure provides a battery charger including a housing and an anti-theft mechanism. The housing includes a battery attachment portion to which the battery pack can be removably coupled. The anti-theft mechanism includes an arm extending away from the housing and engageable by a battery pack, a cover that is movable to a deployed position such that it covers the release buttons of a battery pack, and a lock that engages the cover to maintain the cover in the deployed position. The lock is operable to an unlocked mode thereby allowing the cover to return to the retracted position, allowing access to the release buttons.

In another embodiment, the disclosure provides a battery charger including a housing and an anti-theft mechanism. The housing includes a battery attachment portion to which a battery pack can be coupled. The anti-theft mechanism includes an arm extending away from the housing that is engageable by a battery, a latch, a cover, and a lock. The latch is rotatable with the lock and engages the cover. The cover is movable to a deployed position in response to movement of the arm and latch. The lock engages the latch to allow the cover to return to the retracted position, allowing access to the release buttons.

In another embodiment, the disclosure provides a battery charger having a housing, a battery pack removably coupled to the housing, and an anti-theft mechanism coupled to the housing. The battery pack has two release buttons for decoupling the battery pack from the housing. The anti-theft mechanism includes an arm, a cover, and a lock. The arm extends beyond the housing and is engageable by the battery pack. The arm is pivotable in response to the engagement by the battery pack. The cover rotates to a deployed position in response to the battery pack engaging the arm. The lock is movable between a locked mode and an unlocked mode, and maintains the cover in the deployed position when in the locked mode.

Other aspects of the disclosure will become apparent by consideration of the detailed description and accompanying drawings.

BRIEF DESCRIPTION OF THE DRAWINGS

FIGS. 8A-8D are side views of the anti-theft mechanism according to FIG. 1, showing various positions of the anti-theft mechanism components.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
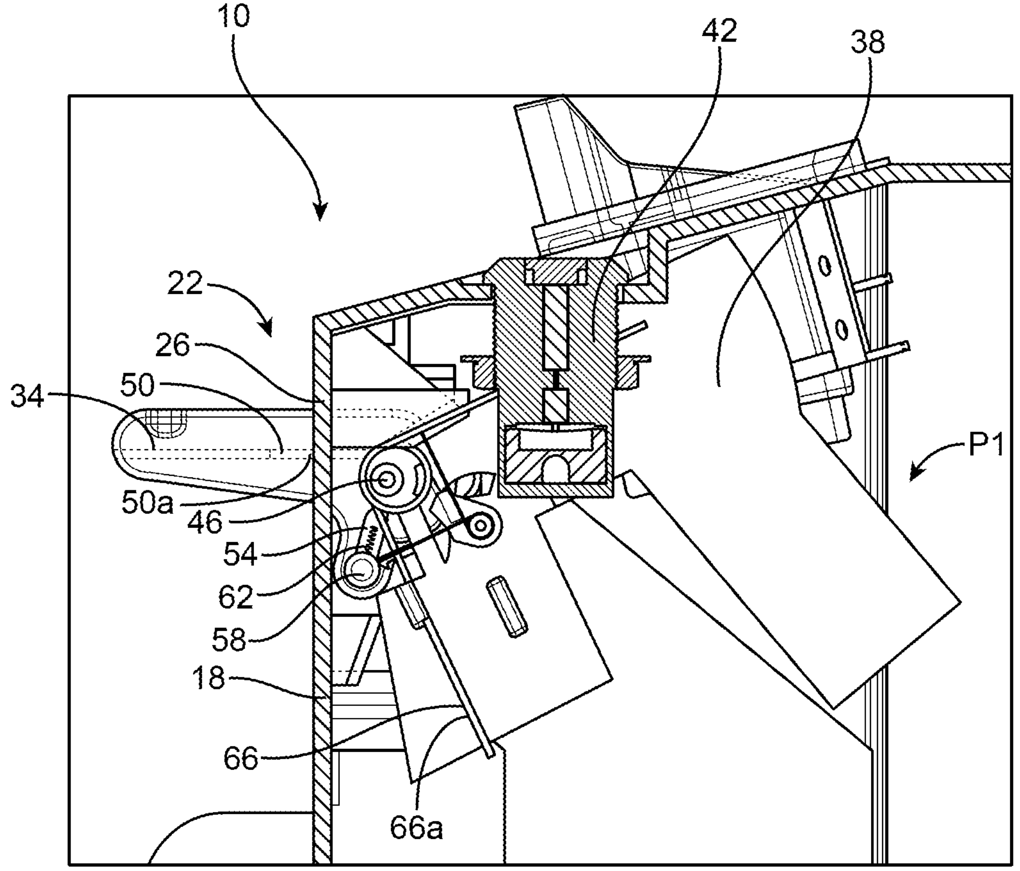
FIG. 1 is a side view of an exemplary battery charger according to the present disclosure.

FIGS. 1-9B illustrates a first exemplary battery charger 10 configured to removably receive and charge a battery pack 14. As shown in FIG. 1, the battery charger 10 includes a housing 18 and an anti-theft mechanism 22 coupled to the housing 18. The battery charger 10 may be an AC-DC battery charger, a DC-DC battery charger, or a battery charger capable of both AC-DC charging and DC-DC charging. The battery pack 14 may be, for instance, an 18V battery pack, although other battery packs (e.g., 4V, 12V, etc.) may be used instead. The housing 18 defines a battery attachment portion 26, for instance a battery interface including a pair of rails (not shown) engageable with the battery pack 14, with the pair of rails interacting with a connection interface having a pair of grooves (not shown) on a battery pack 14 for sliding the battery pack 14 relative to the housing 18. Other methods of coupling the battery pack 14 to the housing 18 may be possible. The battery pack 14 includes at least one release button 30. The release button 30 is configured to release the battery pack 14 from connection with the battery charger 10 or a tool housing (not shown). The battery pack 14 may have a plurality of release buttons 30, for instance, two release buttons.

The anti-theft mechanism 22 is coupled to the housing 18. As shown in the present embodiment, the anti-theft mechanism 22 is coupled to the housing 18 proximate the battery attachment portion 26. The anti-theft mechanism 22 includes an arm 34, a cover 38, and a lock 42. The arm 34 extends away from the housing 18 beyond the battery attachment portion 26, for instance, through an arm slot (not pictured) defined by the housing 18. The arm 34 moves relative to the housing 18 by pivoting about an arm pivot 46, due to engagement by the battery pack 14, for instance when the battery pack 14 is slidingly coupled to the housing 18. The arm 34 may instead by movable in a linear motion relative to the housing 18. The arm 34 is biased to extend way from the housing 18 by an arm biasing member 50. The arm biasing member 50 is embodied as a torsion spring that has a first leg 50*a* that engages the arm 34 and a second leg (not shown) that engages the housing 18. Other biasing members (e.g., a compression spring, leaf spring, etc.) may be used in place of a torsion spring.

Figure 9A:
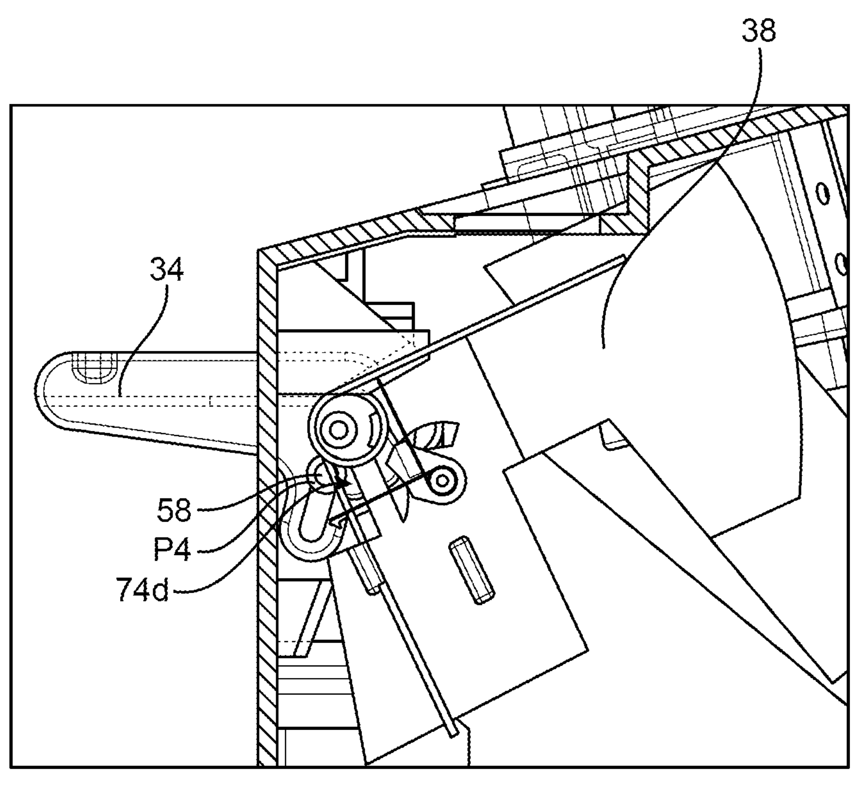
FIGS. 9A-9B are side views of a battery charger according to FIG. 1, showing various positions of the pin relative to the arm.

The arm 34 defines a slot 54 in which a pin 58 is disposed. The pin 58 is coupled to the arm 34 by a pin biasing member 62, embodied as a compression spring. The pin 58 may instead be coupled to the arm 34 by a torsion spring or other appropriate biasing member. The pin 58 is movable in the slot 54 between an extended position P3 (FIG. 9B) and a compressed position P4 (FIG. 9A). The pin biasing member 62 biases the pin 58 toward the extended position P3.

Figure 2:
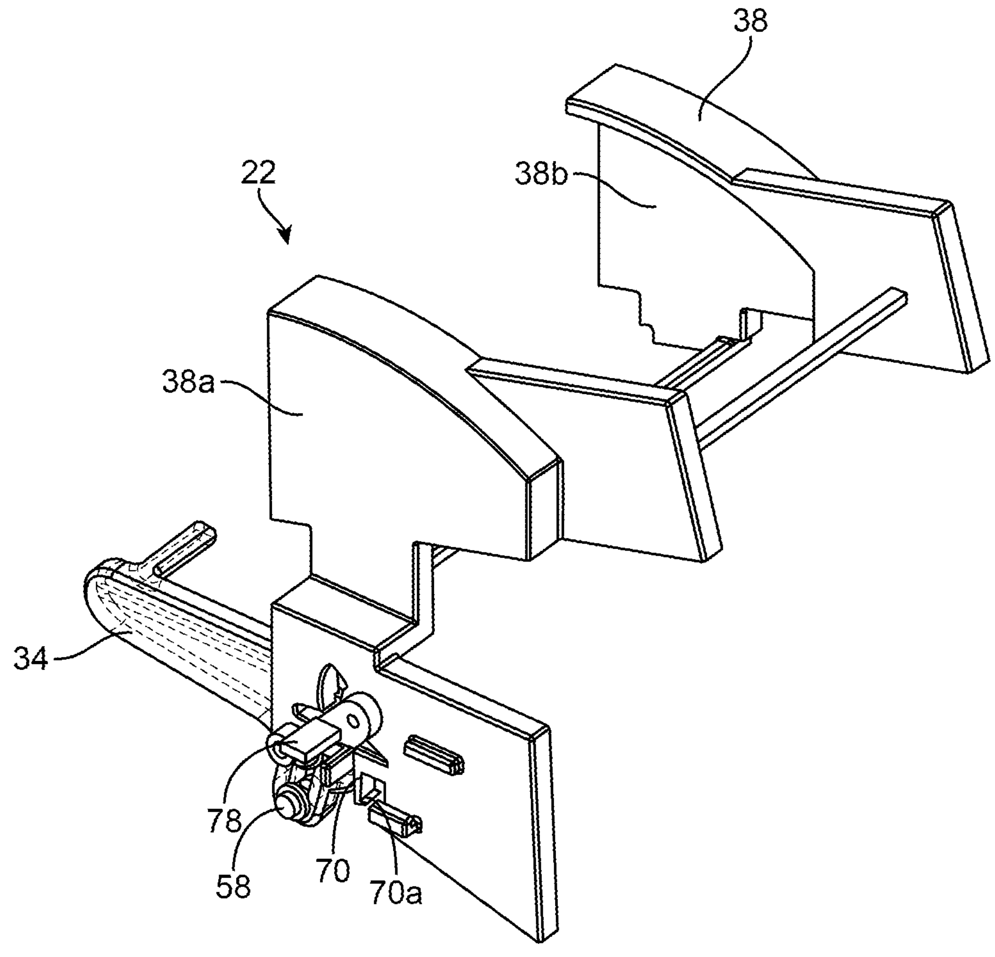
FIG. 2 is a perspective view of an anti-theft mechanism according to FIG. 1.
Figure 3:
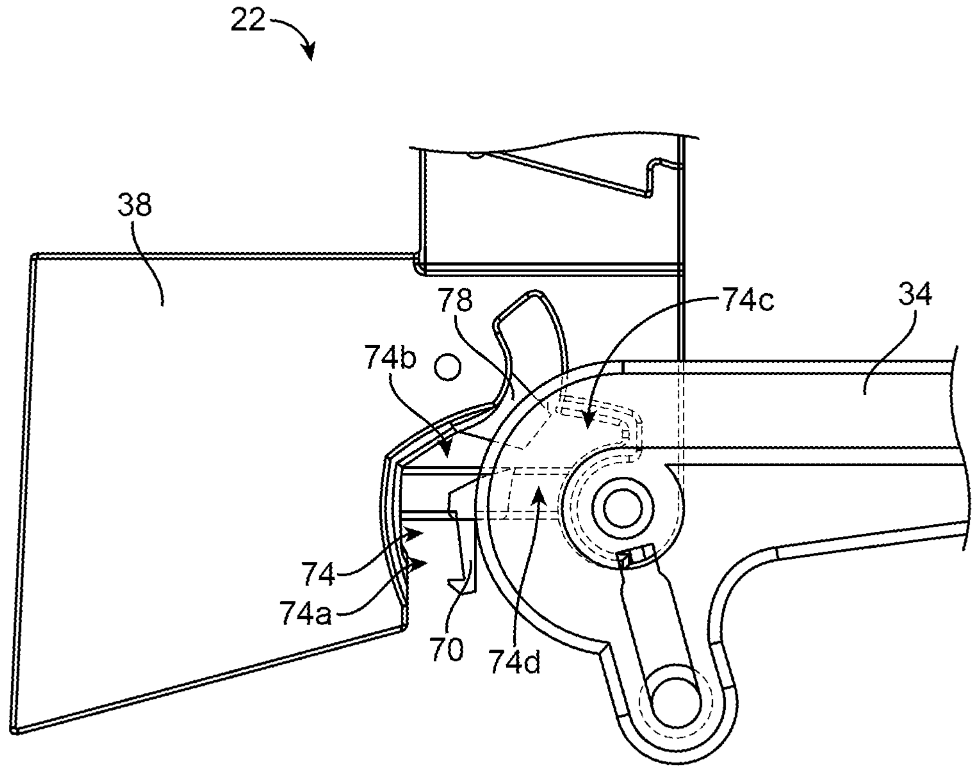
FIG. 3 is a side view of a of portion of the anti-theft mechanism according to FIG. 1.

The cover 38 is movable from a retracted position P1 (FIG. 1) to a deployed position P2 (FIG. 4) by actuation of the arm 34. The cover 38 is disposed in the housing 18 when positioned at the retracted position P1. When the cover 38 is in the deployed position P2, the cover 38 extends beyond the housing 18, for instance through a cover slot (not shown) defined in the housing 18. In the deployed position P2, the cover 38 is disposed adjacent to and outward of the release button 30 of the battery pack 14 thereby shielding the release buttons 30 such that a person would be prevented from accessing the release button 30 and removing the battery pack 14 from the battery charger 10. As shown in FIG. 2, the cover 38 has a first cover face 38*a* and a second cover face 38*b* opposite the first cover face 38*a* to prevent access to a pair of release buttons 30 spaced at a first side 14*a* and opposite second side (not pictured) of the battery pack 14. In some embodiments of a battery charger configured to receive a battery pack having only one release button, the second cover face 38*b* may be omitted. As shown in FIG. 3, the cover 38 defines a deflecting arm 70 with a wedge 70*a* extending from the cover 38. The deflecting arm 70 is elastically deformable so as to allow movement of the deflecting arm 70 in relation to the cover 38 in response to application of a force without separation of the deflecting arm 70 from the cover 38. The cover 38 defines a cover track 74 that includes a first passage 74*a*, a second passage 74*b*, a third passage 74*c*, and a fourth passage 74*d*. The cover 38 and cover track 74 will be discussed further in relation to operation of the anti-theft mechanism 22 below.

Returning with reference to FIG. 1, the cover 38 is pivotally coupled to the housing 18 coaxially with the arm 34 at the arm pivot 46. In some embodiments, the cover 38 may instead by pivotally coupled to the housing 18 at another location. In other embodiments, the cover 38 may be slidable relative to the housing 18 between the retracted position P1 and the deployed position P2. The cover 38 is biased toward the retracted position P1 by gravity. The cover 38 may instead be biased toward the retracted position P1 by a cover biasing member 66. The cover biasing member 66 is embodied as a torsion spring with a first leg 66*a* that engages the cover 38 and a second leg 66*b* configured to engage the housing 18. In other embodiments, the cover biasing member may be another structure capable to biasing the cover 38 toward the retracted position P1.

The lock 42 is coupled to the housing 18. The lock 42 has a locked mode M1 and an unlocked mode (not shown). The lock 42 engages a portion of the cover 38, for instance, a tab 38*c* extending from the cover 38, when the lock 42 is in the locked mode M1 and the cover 38 is in the deployed position P2. When in the locked mode M1, the lock 42 may engage the cover 38 continuously. The lock 42 may be a push lock, a cam lock, or other lock type.

With reference to FIG. 2, a deflector 78 is pivotally coupled to the cover 38 proximate to, and at least partially disposed in, the cover track 74. In some embodiments, the deflector 78 may be slidably coupled to the cover 38. In other embodiments, the deflector is integrally formed with the cover 38 with a portion that is movable relative to the cover. As shown in FIGS. 8A-8D, the deflector 78 pivots between a disengaged position P5 and an engaged position P6 by engagement with the pin 58. The deflector 78 is biased toward the disengaged position by a deflector biasing member 82, embodied as a torsion spring with a first leg 82*a* engaging the deflector 78 and a second leg 82*b* configured to engage the cover 38. In other embodiments, the biasing member may be a compression spring, leaf spring, etc.

Figure 4:
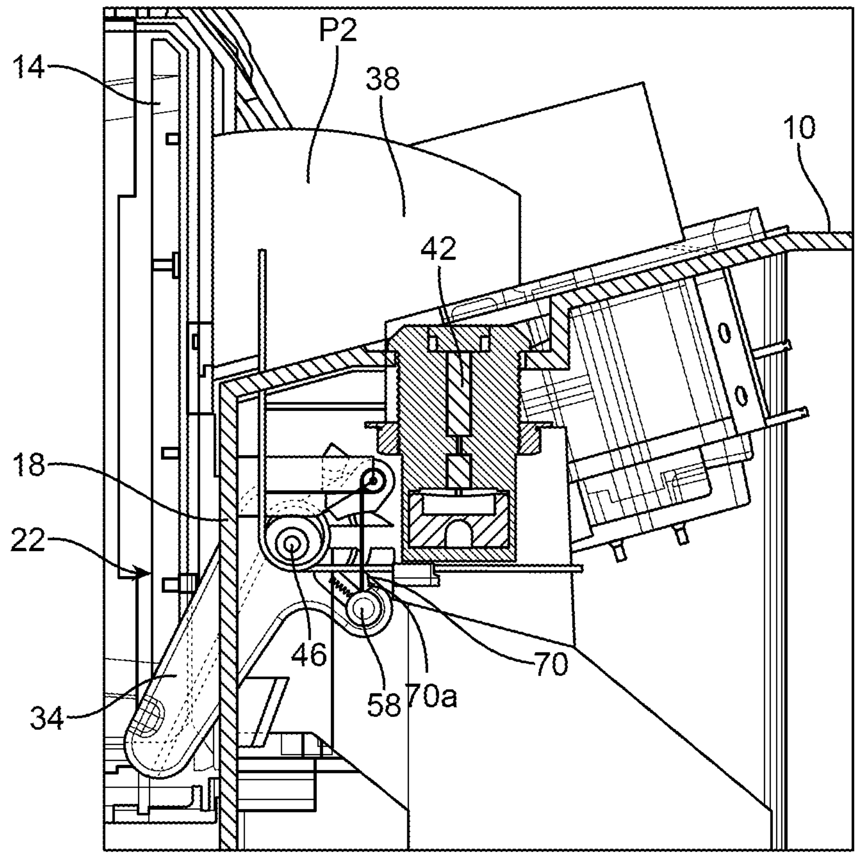
FIG. 4 is a side view of a battery charger according to FIG. 1, showing a battery pack partially inserted and the resulting position of the anti-theft mechanism.

Now the operation of the battery charger 10 will be described in more detail. As shown in FIG. 4, as a battery pack 14 is slidably coupled to the battery charger 10 at the battery attachment portion 26, the battery pack 14 engages the arm 34. The arm 34 pivots about arm pivot 46 in response to engagement by the battery pack 14. As the arm 34 pivots, the pin 58 coupled to the arm 34 engages the wedge 70*a* of the deflecting arm 70 of the cover 38. The cover 38 pivots from the retracted position P1 to the deployed position P2 in response to engagement of the pin 58 with the deflecting arm 70. As the cover 38 pivots from the retracted position P1 to the deployed position P2, the tab 38*c* engages the lock 42 in the locked mode M1 (shown in FIG. 7). The lock 42 retains the cover 38 in the deployed position P2 while the lock 42 is in the locked mode M1.

Figure 5:
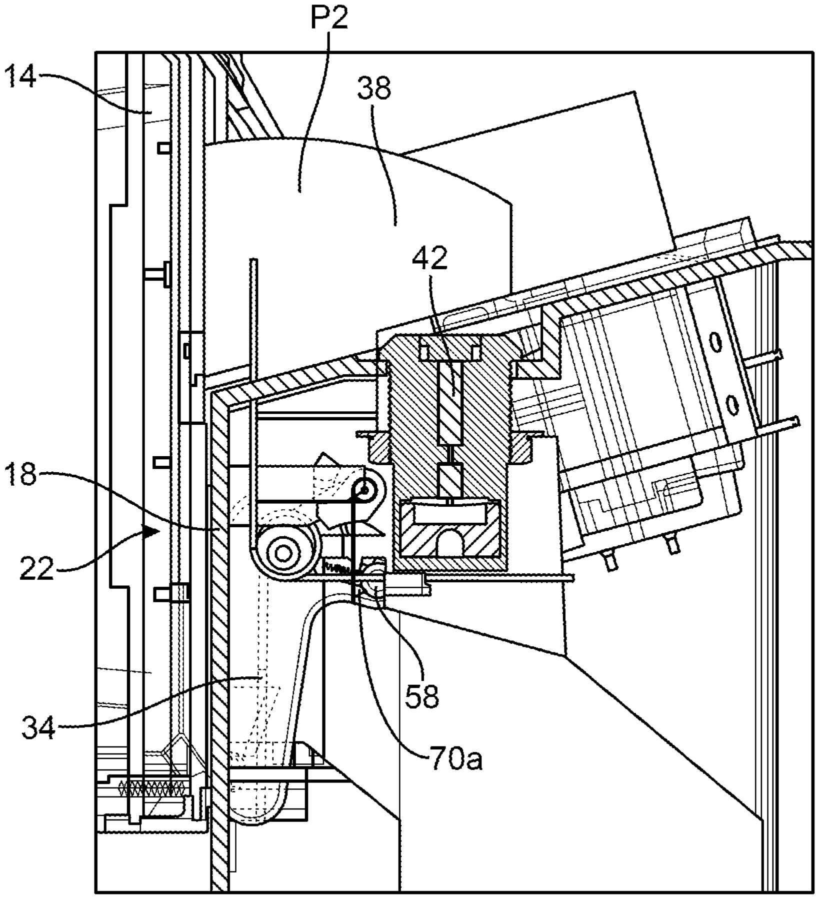
FIG. 5 is a side view of a battery charger according to FIG. 1, showing the battery pack fully inserted and the resulting position of the anti-theft mechanism.
Figure 6:
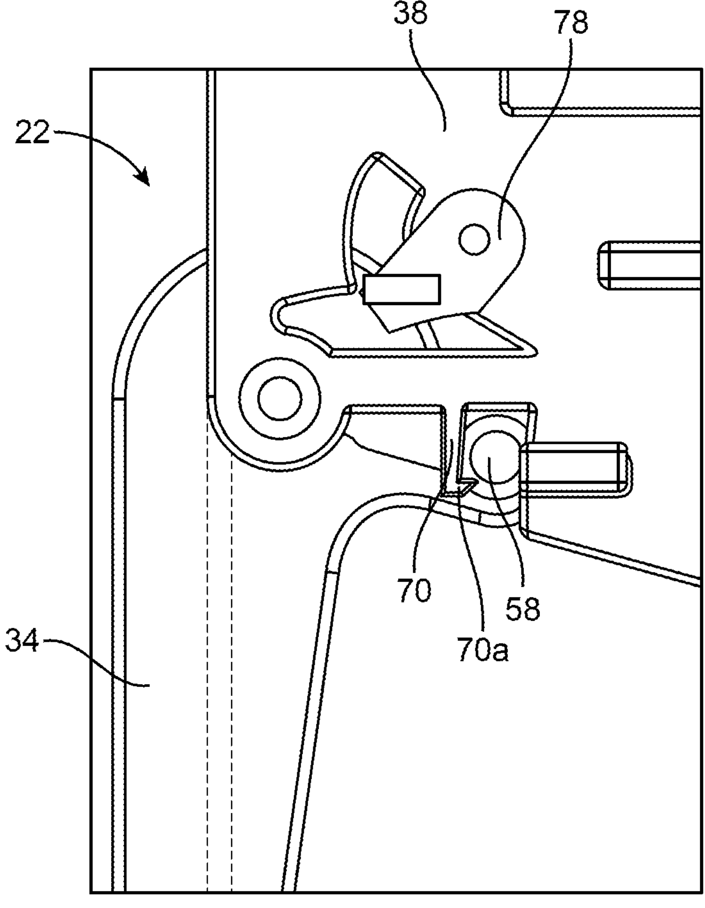
FIG. 6 is an enlarged side view of the anti-theft mechanism according to FIG. 5.
Figure 7:
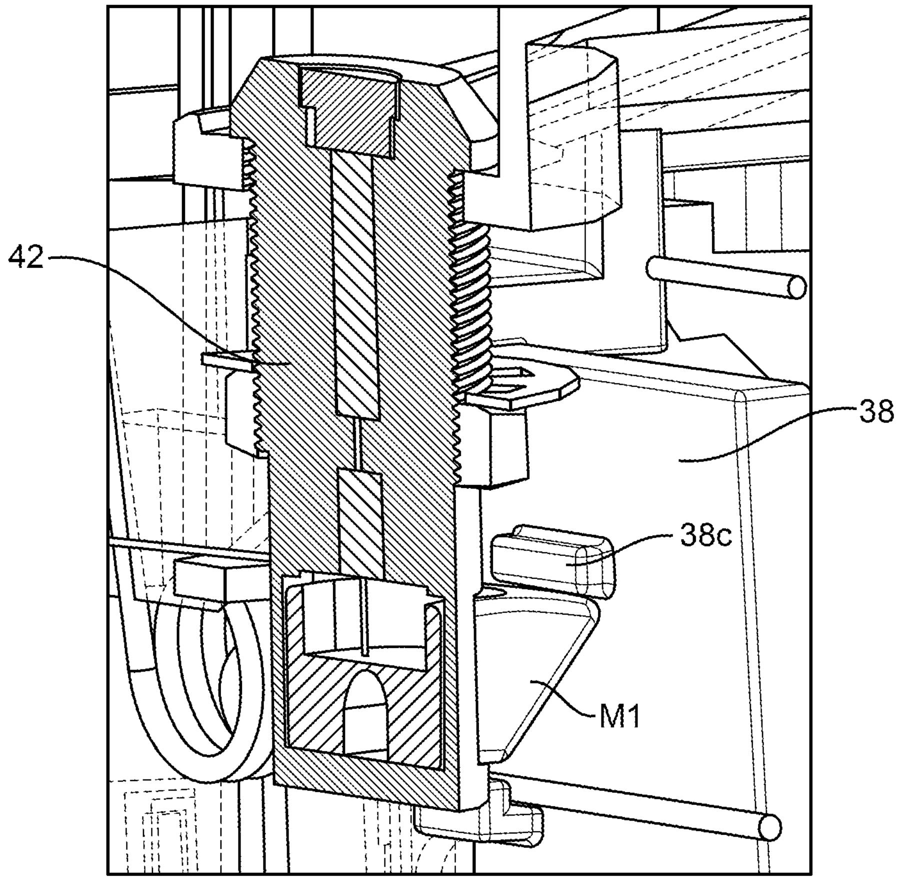
FIG. 7 is a perspective view of a battery charger according to FIG. 1, showing the lock engaging the cover.

When the cover 38 has reached the deployed position P2, the first cover face 38*a* and second cover face 38*b* are positioned adjacent and outward of the release buttons 30 thereby covering, that is, shielding and preventing access to the release buttons 30. As shown in FIGS. 5 and 6, when the cover 38 has reached its deployed position P2, the arm 34 continues to pivot until the battery pack 14 is fully coupled to the battery charger 10. As the arm 34 pivots, the pin 58 exerts a force on the wedge 70*a* of the deflecting arm 70 that exceeds the force required to cause deflection of the deflecting arm 70. Following deflection of the deflecting arm 70, the pin 58 passes the wedge 70*a* and enters the first passage 74*a* of the cover track 74, shown in FIG. 8A. The pin 58 remains disposed in the first passage 74*a* when the cover 38 is in deployed position P2 and the lock 42 is in the locked mode M1 and engaging the cover 38.

To remove the battery pack 14 from the battery charger 10, the lock 42 is changed from the locked mode M1 to the unlocked mode (not shown). In the unlocked mode, the lock 42 is disengaged from the cover 38 thereby allowing the cover 38 to return to the retracted position P1 in response to a bias. When the cover 38 is in the retracted position P1, a person may access the release buttons 30 and thereby remove the battery pack 14 from the battery charger 10. As shown in FIGS. 8A-8D, as the cover 38 returns to the retracted position P1, the pin 58 passes from the first passage 74*a* to the second passage 74*b* (FIG. 8B). The pin 58 then engages the deflector 78 and the deflector 78 pivots from a disengaged position P5 at which position the deflector 78 is at least partially disposed in the cover track 74 to an engaged position P6 at which position the deflector 78 is not disposed in the cover track 74, in response to engagement of the pin 58 (FIG. 8C). The pin 58 passes from the second passage 74*b* to the third passage 74*c* as it engages the deflector 78. When the pin 58 has passed into the third passage 74*c*, the deflector returns to the disengaged position P5 in response to the bias of the deflector biasing member 82 (FIG. 8D). The deflector 78 prevents the pin 58 from returning to the second passage 74*b*. While in the third passage 74*c*, the pin 58 is in the compressed position P3 in response to engagement with the deflector 78.

Figure 9B:
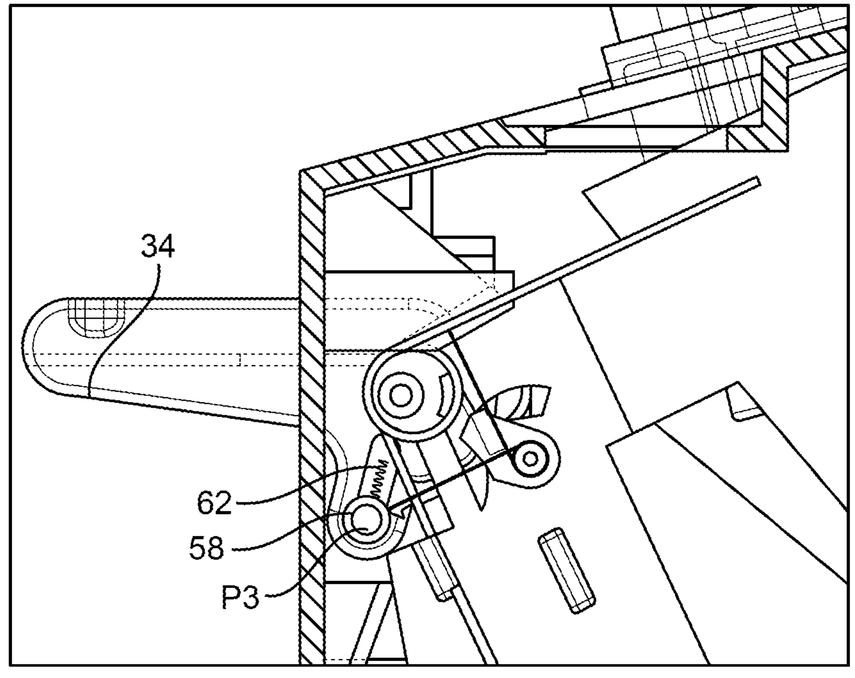

As shown in FIGS. 9A and 9B, when the battery pack 14 is decoupled from the battery charger 10, the arm 34 pivots such that the arm 34 extends beyond the battery attachment portion 26. As the arm 34 pivots, the pin 58 passes into the fourth passage 74*d*. When the arm 34 has pivoted to extend beyond the battery attachment portion 26, the pin 58 has passed outside of the fourth passage 74*d* and is no longer engaged such that the pin 58 can return to its extended position P3 in response to the bias provided by the pin biasing member 62.

FIGS. 10-13 illustrate another embodiment of a battery charger 110 configured to removably receive and charge a battery pack 14. The battery charger 110 includes a housing 114 and an anti-theft mechanism 118 coupled thereto. The housing 114 defines a battery attachment portion 122 to which a battery pack 14 can be removably coupled, for instance, by sliding the battery pack 14 relative to the battery attachment portion 122. The battery charger 110 may be a DC-DC battery charger, an AC-DC battery charger, or a battery charger capable of both DC-DC and AC-DC charging.

The anti-theft mechanism 118 includes an arm 126, a latch 130, a cover 134, and a lock 138. The arm 126 extends away from the housing 114 beyond the battery attachment portion 122. The housing 114 may define an arm slot (not shown) through which the arm 126 extends. The arm 126 is movable, for instance, by pivoting about in a first rotational direction D1 by engagement with the battery pack 14. The arm 126 pivots relative to the housing 114 about an arm pivot 142. The arm 126 is biased to extend beyond the battery attachment portion 122 by an arm biasing member 146, illustrated as a torsion spring that has a first leg 146*a* engaging the arm 126 and a second leg 146*b* that engages the housing 114. The arm biasing member may instead be a compression spring, leaf spring, or other structure that provides a biasing force.

A latch 130 is coupled to the arm 126 at a latch pivot (not shown) and is pivotable with the arm 126 about the in the first rotational direction D1 about arm pivot 142. The latch 130 is pivotable relative to the arm 126 in a second rotational direction D2 about a rotational axis A2 (shown in FIG. 13). The latch 130 is biased to pivot in the second rotational direction D2 to a latched position P7 by a latch biasing member 154, illustrated as a torsion spring with a first leg 154*a* engaging the latch 130 and a second leg 154*b* engaging the arm 126. Other types of biasing members that provide a biasing force such as a compression spring may instead be used. The latch 130 defines a pin hole 158 in which a pin 162 is disposed. The pin 162 is connected in the pin hole 158 by a compression spring (not shown). The pin 162 is movable between an extended position P8 and a compressed position P9.

The cover 134 is movable from a retracted position P10 (FIG. 10) to a deployed position P11 (FIG. 11) by actuation of the arm 126. The cover 134 is disposed in the housing 114 when positioned at the retracted position P10. When the cover 134 is in the deployed position P11, the cover 134 extends beyond the housing 114, for instance through a cover slot (not shown) defined in the housing 114. In the deployed position P11, the cover 134 is disposed adjacent and outward from the release button 30 of the battery pack 14 shielding the release button 30 such that a person would be prevented from accessing the release button 30 and removing the battery pack 14 from the battery charger 110. The cover 134 may comprise a first cover face 134*a* and a second cover face (not shown) opposite the first cover face 134*a*, the cover 134 thereby preventing access to a pair of release buttons 30 spaced at a first side 14*a* and opposite second side 14*b* of the battery pack 14. In other embodiments of a battery charger 110 configured to be coupled to a battery pack having only one release button 30, the cover 134 may include only one cover face (e.g., first cover face 134*a*). The cover 134 is pivotally coupled to the housing 114 coaxially with the arm 126 at the arm pivot 142. The cover 134 may instead by pivotally coupled to the housing 114 at another pivot location. The cover 134 is biased toward the retracted position P10 by gravity. The cover 134 may instead be biased toward the retracted position P10 by a cover biasing member 170, illustrated as a torsion spring that has a first leg 170*a* that engages the cover 134 and a second leg 170*b* that engages the housing 114. A cover stop 174 may be coupled to the housing 114 to prevent the cover 134 from pivoting past the retracted position P10. The cover 134 defines a recess 178 that is configured to receive the latch 130. In particular, the recess 178 is configured to receive the pin 162. The interoperation of the latch 130 and the cover 134 will be described in further detail below.

The lock 138 is coupled to the housing 114. The lock 138 may be a cam lock, or other suitable lock. The lock 138 is movable, for instance, by pivoting, between a locked position P12 and an unlocked position P13 (shown in FIGS. 12 and 13). When the lock 138 is pivoted from the locked position P12 to the unlocked position P13, the lock 138 engages the latch 130 and pivots the latch 130 against the bias in the second rotational direction D2 and away from the cover 134.

Figure 10:
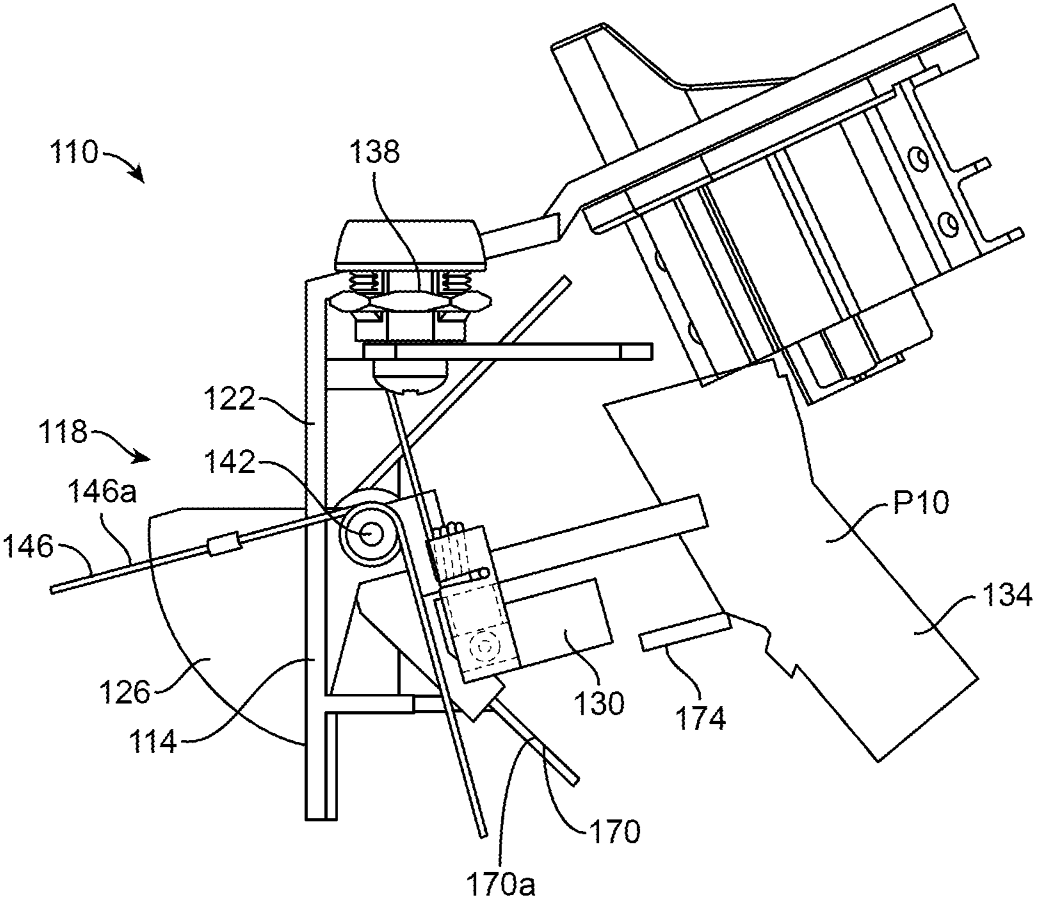
FIG. 10 is a section view of another exemplary battery charger according to the present disclosure.

Operation of the battery charger 110 according to the second embodiment will now be described in more detail. As shown in FIG. 10, when a battery pack 14 is not coupled to the battery charger 110, the arm 126 extends beyond the battery attachment portion 122. The cover 134 is biased toward the retracted position P10 and is disposed inside the housing 114. The latch 130 is biased toward the latched position P7 and the pin 162 is disposed in the recess 178.

Figure 11:
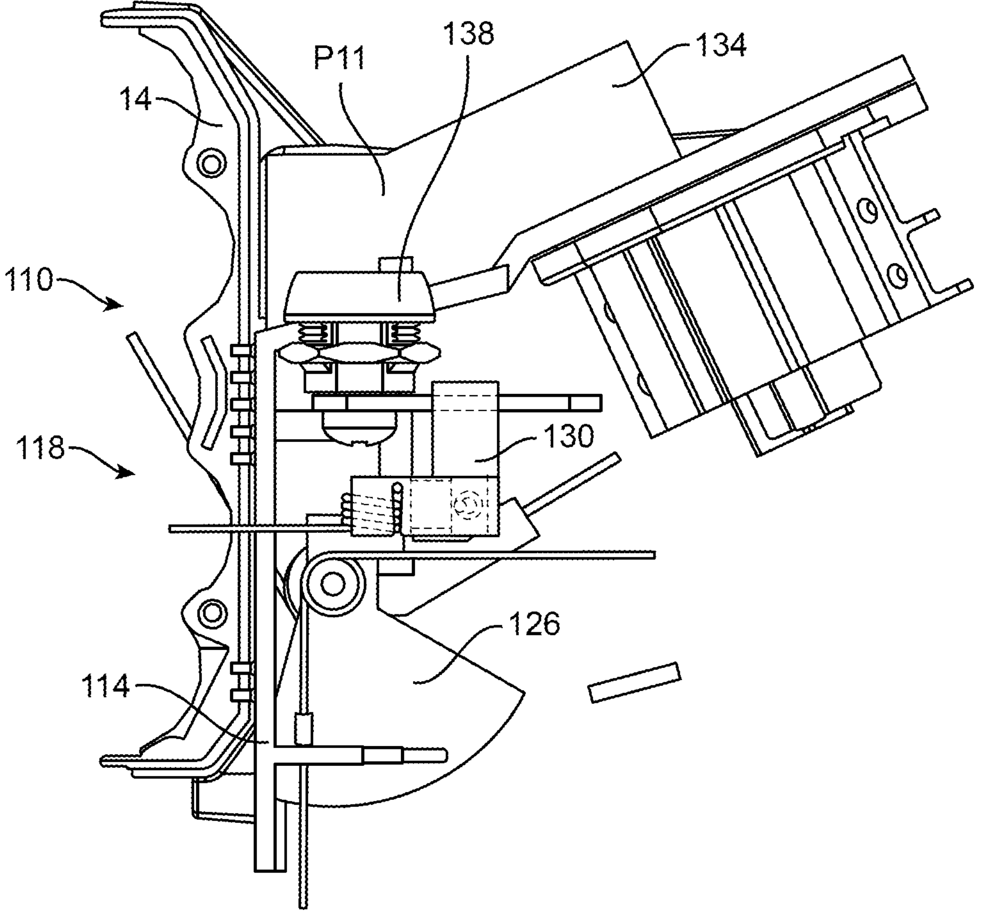
FIG. 11 is a section view of the battery charger according to FIG. 10, showing a battery pack fully inserted in relation to the battery charger.

As shown in FIG. 11, when a battery pack 14 has been removably coupled to the battery charger 110, the battery pack 14 engages the arm 126. The arm 126 pivots in the first rotational direction D1 in response thereto, with the latch 130 and pin 162 pivoting in the first rotational direction D1 with the arm 126. The cover 134 rotates in response to engagement of the battery pack 14 with the arm 126 due to the pin 162 being disposed in the recess 178. The cover 134 is thereby pivoted to the deployed position P11 and is disposed outside of the housing 114 adjacent to and over the release button 30 such that a person cannot access the release button 30. The battery pack 14 is thereby protected against removal.

Figure 12:
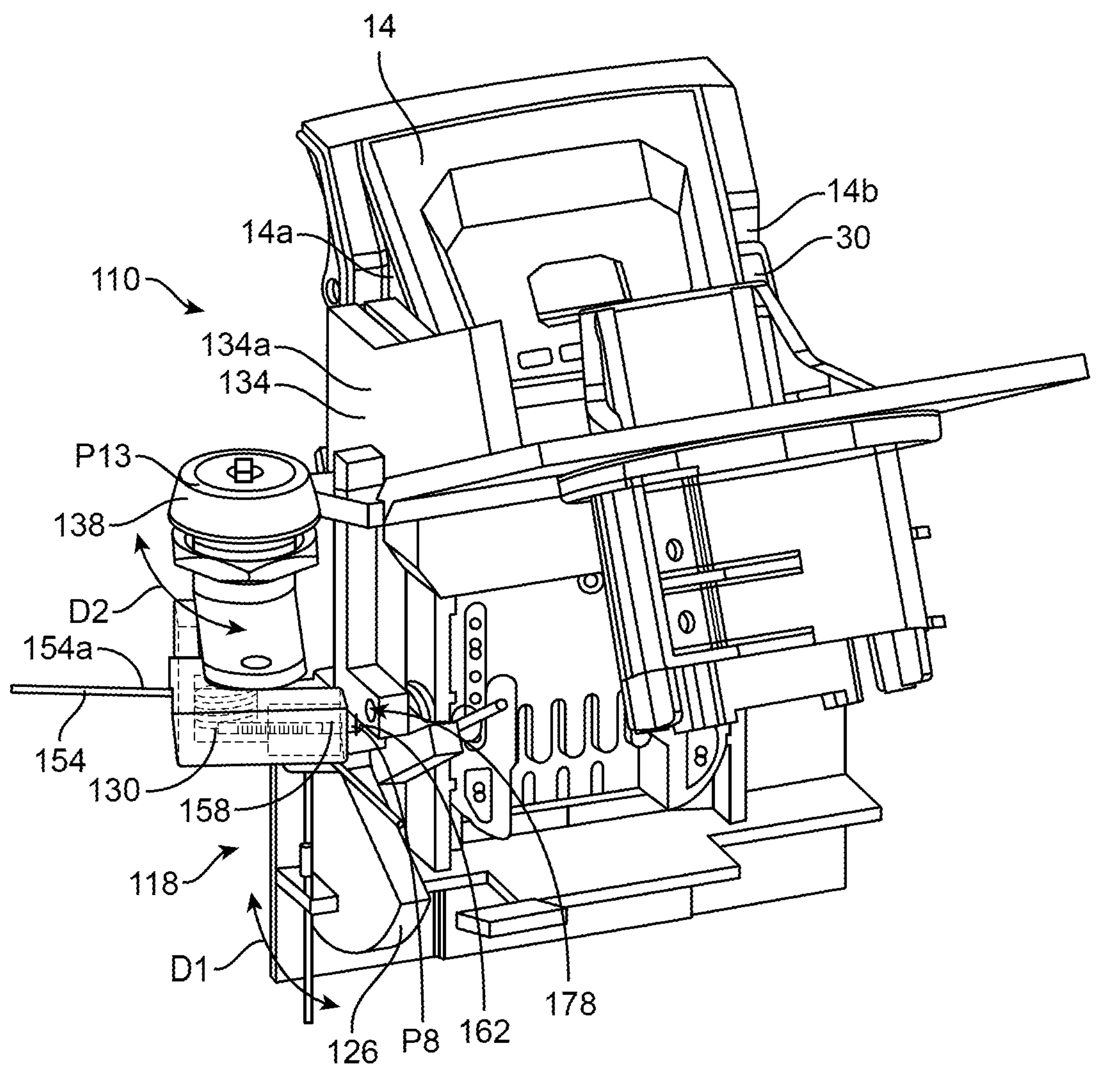
FIG. 12 is a perspective view of the of the battery charger according to FIG. 10, showing a lock in an unlocked position.
Figure 13:
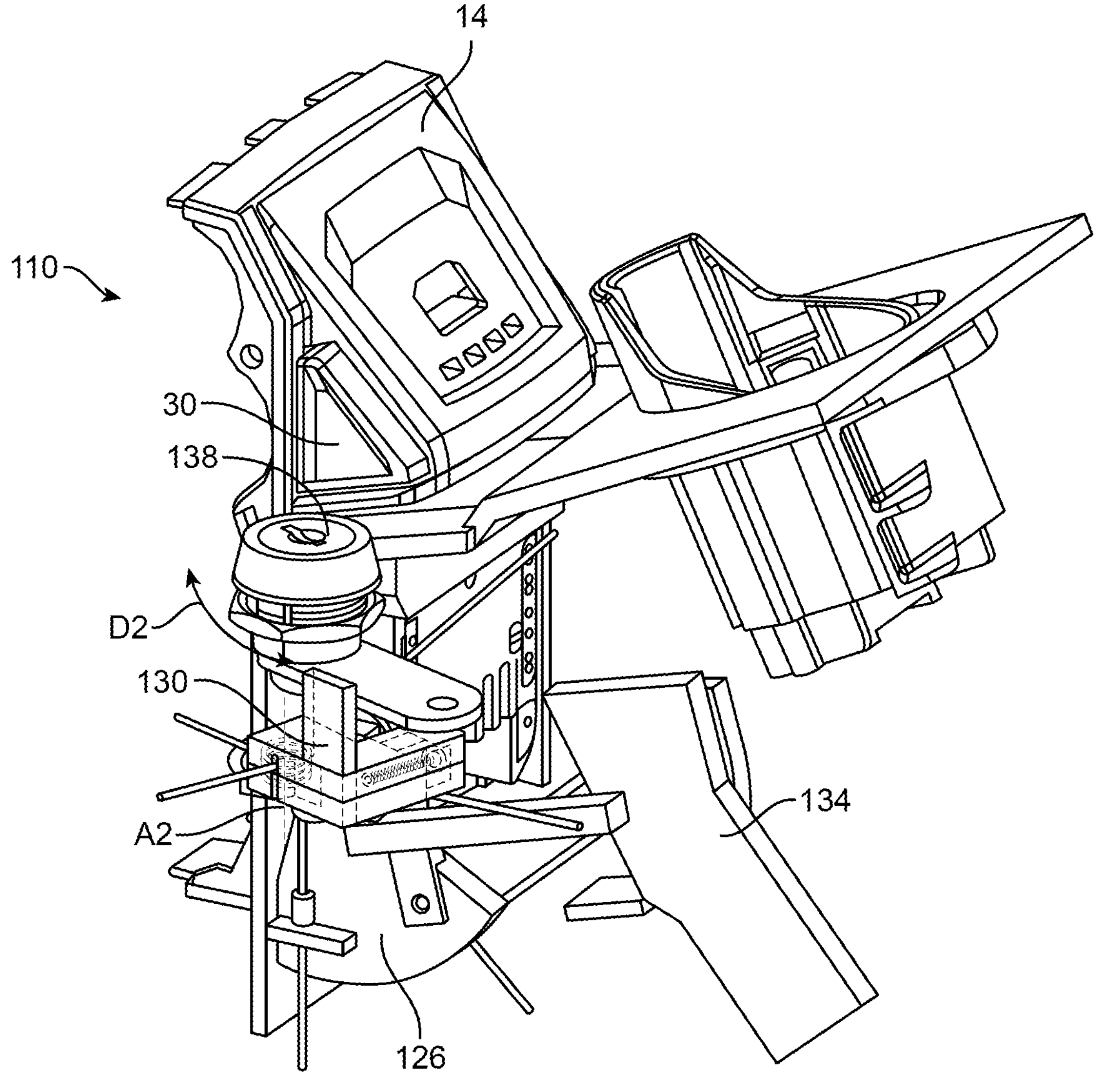
FIG. 13 is another perspective view of the battery charger according to FIG. 12.

As shown in FIG. 12, to access the release button 30 and decouple the battery pack 14 from the battery charger 110, the lock 138 is moved from the locked position P12 (FIG. 11) to the unlocked position P13 (FIG. 12), for instance by turning a key in the lock 138. The lock 138 pivots in response thereto, engaging the latch 130 and applying a force to overcome the bias provided by the latch biasing member 154. The latch 130 pivots from the latched position P7 and the pin 162 pivots therewith so as to no longer be disposed in the recess 178. As shown in FIG. 13, with the pin 162 no longer disposed in the recess 178, the cover 134 returns to the retracted position P10.

The arm 126 pivots in the first rotational direction D1 upon decoupling the battery pack 14 from the housing 114, with the latch 130 pivoting therewith. As the latch 130 pivots in the first rotational direction D1 with the arm 126, the pin 162 engages the cover 134 thereby causing the pin 162 to move to the compressed position (not shown). When the latch 130 rotates such that the pin 162 is aligned with the recess 178, the bias exerted by compression spring (not shown) causes pin 162 to return to the extended position P8 (FIG. 12) with the pin 162 at least partially disposed in the recess 178.

It will be appreciated by those skilled in the art that a further advantage of the embodiments of the anti-theft mechanisms 22, 118 is that inadvertent removal of a battery pack 14 will be prevented as access to the release buttons 30 will be prevented when the cover 38, 134 is in the deployed position P2, P11.

What is claimed is:

1. A battery charger to removably receive and charge a battery pack, the battery charger comprising:
- a housing defining a battery attachment portion; and
- an anti-theft mechanism coupled to the housing, the anti-theft mechanism including
  - an arm extending away from the housing beyond the battery attachment portion, the arm configured to move due to engagement by the battery pack,
  - a cover movable from a retracted position to a deployed position by actuation of the arm, and
  - a lock coupled to the housing, the lock having a locked mode and an unlocked mode, the lock engaging a portion of the cover in the locked mode to maintain the cover in the deployed position.

2. The battery charger of claim 1, wherein the arm is configured to pivot due to engagement by the battery pack.

3. The battery charger of claim 1, wherein the lock engages a portion of the cover continuously in the locked mode.

4. The battery charger of claim 1, wherein the cover is configured to shield a release button of the battery pack with the cover in the deployed position.

5. The battery charger of claim 4, wherein the cover is configured to cover a plurality of release buttons of the battery pack with the cover in the deployed position.

6. The battery charger of claim 1, wherein
- the cover defines a deflecting arm, and
- the arm defines a slot, the arm further including
  - a pin movable between an extended position and a compressed position, the pin disposed in the slot and engaging the deflecting arm due to engagement of the arm by the battery pack, the cover moving from the retracted position to the deployed position in response to engagement of the arm by the battery pack.

7. The battery charger of claim 6, further comprising a deflector pivotable from a disengaged position to an engaged position by engagement of the pin.

8. The battery charger of claim 7, the cover further including a track proximate the deflecting arm, the deflector pivotally coupled to the cover proximate and at least partially disposed in the track.

9. The battery charger of claim 8, wherein the pin engages the deflector when the cover pivots from the deployed position to the retracted position.

10. The battery charger of claim 9, wherein the pin is movable from the extended position to the compressed position by engagement with the deflector.

11. The battery charger of claim 1, wherein the cover returns to the retracted position in response to the lock changing from the locked mode to the unlocked mode.

12. The battery charger of claim 1, wherein the lock includes a push lock.

13. A battery charger configured to removably receive and charge a battery pack, the battery charger comprising:
- a housing defining a battery attachment portion; and
- an anti-theft mechanism coupled to the housing, the anti-theft mechanism including
  - an arm extending away from the housing beyond the battery attachment portion, the arm configured to pivot due to engagement by the battery pack,
  - a latch pivotable in a first rotational direction with the arm and biased to pivot in a second rotational direction relative to the arm,
  - a cover including a recess, the cover being movable from a retracted position to a deployed position by actuation of the arm, the recess configured to receive the latch, insertion of the latch into the recess moving the cover to the deployed position, and
  - a lock, the lock moving the latch against a bias away from the cover.

14. The battery charger of claim 13, wherein the latch is biased to pivot in the second rotational direction relative to the arm by a torsion spring.

15. The battery charger of claim 14, the latch defining a pin hole, the latch having a pin disposed in the pin hole and received in the recess.

16. The battery charger of claim 15, wherein the pin is removed from the recess in response to the lock moving the latch against the bias.

17. The battery charger of claim 13, wherein the cover is configured to shield a release button of the battery pack with the cover in the deployed position.

18. The battery charger of claim 13, wherein the lock includes a cam lock.

19. The battery charger of claim 13, wherein the cover is biased to the retracted position by a torsion spring.

20. A battery charger comprising:
- a housing defining a battery attachment portion, the battery attachment portion including a battery interface;
- a battery pack having a connection interface configured to slidingly couple the battery pack to the battery interface, the battery pack including
  - two release buttons on opposite sides of the battery pack, wherein actuation of the two release buttons releases the battery pack from the battery attachment portion;

an anti-theft mechanism coupled to the housing, the anti-theft mechanism including an arm extending away from the housing, the arm configured to rotate due to engagement by the battery pack, a cover movable from a retracted position to a deployed position by actuation of the arm, the cover configured to cover the two release buttons with the cover in the deployed position, and a lock coupled to the housing and having a locked mode and an unlocked mode, the lock configured to maintain the cover in the deployed position with the lock in the locked mode.

* * * * *